(12) United States Patent
Bretaudeau et al.

(10) Patent No.: US 7,448,605 B2
(45) Date of Patent: Nov. 11, 2008

(54) CONTROLLABLE HYDRAULIC VIBRATION-DAMPING SUPPORT

(75) Inventors: Jean-Pierre Bretaudeau, Chateaudun (FR); Sylvain Durand, Beaugency (FR); Jean-Luc Gastineau, St Jean Froidmentel (FR); Pascal Petit, Beaugency (FR)

(73) Assignee: Hutchinson, Paris (FR)

( * ) Notice: Subject to any disclaimer, the term of this patent is extended or adjusted under 35 U.S.C. 154(b) by 402 days.

(21) Appl. No.: 11/175,926

(22) Filed: Jul. 6, 2005

(65) Prior Publication Data

US 2006/0006593 A1 Jan. 12, 2006

(30) Foreign Application Priority Data

Jul. 7, 2004 (FR) .................................. 04 07543

(51) Int. Cl.
 *F16F 5/00* (2006.01)
(52) U.S. Cl. ................................. 267/140.14
(58) Field of Classification Search ................
 267/140.13–140.15
See application file for complete search history.

(56) References Cited

U.S. PATENT DOCUMENTS

| 5,386,977 | A | 2/1995 | Quast | 267/140.13 |
| 5,839,720 | A * | 11/1998 | Kojima | 267/140.14 |
| 5,865,428 | A * | 2/1999 | Kojima | 267/140.14 |
| 6,386,527 | B2 * | 5/2002 | Oberle | 267/140.14 |
| 2001/0030390 | A1 | 10/2001 | Vermaerke et al. | 267/140.15 |
| 2002/0011700 | A1 | 1/2002 | Oberle | 267/140.11 |
| 2003/0011117 | A1 * | 1/2003 | Nishi et al. | 267/140.14 |
| 2003/0015831 | A1 * | 1/2003 | Takeo et al. | 267/140.14 |

FOREIGN PATENT DOCUMENTS

| EP | B 0 852 304 | 12/1997 |
| EP | 1 176 336 | 7/2001 |

* cited by examiner

*Primary Examiner*—Christopher P Schwartz
(74) *Attorney, Agent, or Firm*—McCracken & Frank LLP

(57) ABSTRACT

A controllable hydraulic vibration-damping support comprising two strength members interconnected by an elastomer body defining a working hydraulic chamber, an auxiliary hydraulic chamber communicating with the working chamber via a constricted passageway, a pneumatic chamber separated from the auxiliary chamber by a moving wall, an electrically controlled vent device for establishing a connection to the air, which device can be actuated electrically in order to put the pneumatic chamber into communication with the atmosphere, and a check valve allowing air to flow only out from the pneumatic chamber towards the atmosphere.

10 Claims, 2 Drawing Sheets

CONTROLLABLE HYDRAULIC VIBRATION-DAMPING SUPPORT

FIELD OF THE INVENTION

The present invention relates to controllable hydraulic vibration-damping supports.

More particularly, the invention relates to a controllable hydraulic vibration-damping support designed to be interposed for vibration-damping purposes between first and second rigid elements, said vibration-dampingz support comprising:
- first and second strength members serving to be fastened to two rigid elements to be connected together;
- an elastomer body which connects the two strength members together and which defines, at least in part, a working chamber filled with liquid;
- an auxiliary chamber itself filled with liquid, communicating with the working chamber via a first constricted passageway;
- a pneumatic chamber separated from the auxiliary chamber by a moving wall; and
- an electrically controlled vent device for establishing a connection to the air, which device can be actuated electrically in order to put the pneumatic chamber into communication with the atmosphere via a check valve normally allowing air to flow only out from the pneumatic chamber towards the atmosphere and not to flow into the pneumatic chamber from the atmosphere.

BACKGROUND OF THE INVENTION

Document U.S. Pat. No. 5,386,977 describes a vibration-damping support of that type.

OBJECTS AND SUMMARY OF THE INVENTION

A particular object of the present invention is to improve vibration-damping supports of the above-mentioned type, in order to improve the effectiveness thereof.

To this end, according to the invention, in a vibration-damping support of the type in question, between the valve seat and the inside surface of the pneumatic chamber, there is defined a dead volume of less than 0.3 cubic centimeters ($cm^3$).

By means of these provisions, the vibration-damping support of the invention offers excellent operating performance.

In various embodiments of the vibration-damping support of the invention, it is optionally possible to use one or more of the following provisions:
- the check valve comprises a valve member resiliently urged against a valve seat, and the vent device comprises an electrical actuator suitable for moving the valve member away from the valve seat;
- the electrical actuator is adapted to generate a magnetic field by induction, and the valve member includes a metal portion adapted to be moved under the effect of said magnetic field;
- the electrical actuator comprises a solenoid surrounding a central passageway, and the valve member includes a metal core mounted to slide in said central passageway;
- the vent device comprises a solenoid valve adapted for selectively opening or closing a passageway to the surrounding air independently of the valve member;
- the pneumatic chamber is defined firstly by said moving wall and secondly by a rigid outside wall which has an inside surface, the check valve comprising a valve member that is resiliently urged against a valve seat, and the valve seat being formed in said outside wall of the pneumatic chamber, in the vicinity of the inside surface of said outside wall;
- the moving wall is an elastomer diaphragm;
- the vibration-damping support further comprises a compensation chamber filled with liquid, which chamber communicates with the working chamber via a second constricted passageway;
- the compensation chamber is separated from the working chamber by a rigid partition provided with a decoupling valve which has two faces communicating respectively with the working chamber and with the compensation chamber, said decoupling valve being adapted to vibrate with limited amplitude between said working chamber and said compensation chamber; and
- the first constricted passageway has a resonant frequency lying in the range 20 hertz (Hz) to 80 Hz.

BRIEF DESCRIPTION OF THE DRAWINGS

Other characteristics and advantages of the invention appear from the following description of two embodiments thereof, given by way of non-limiting example and with reference to the accompanying drawings.

In the drawings.

In the various figures, like references designate elements that are identical or similar.

MORE DETAILED DESCRIPTION

Figure 1:
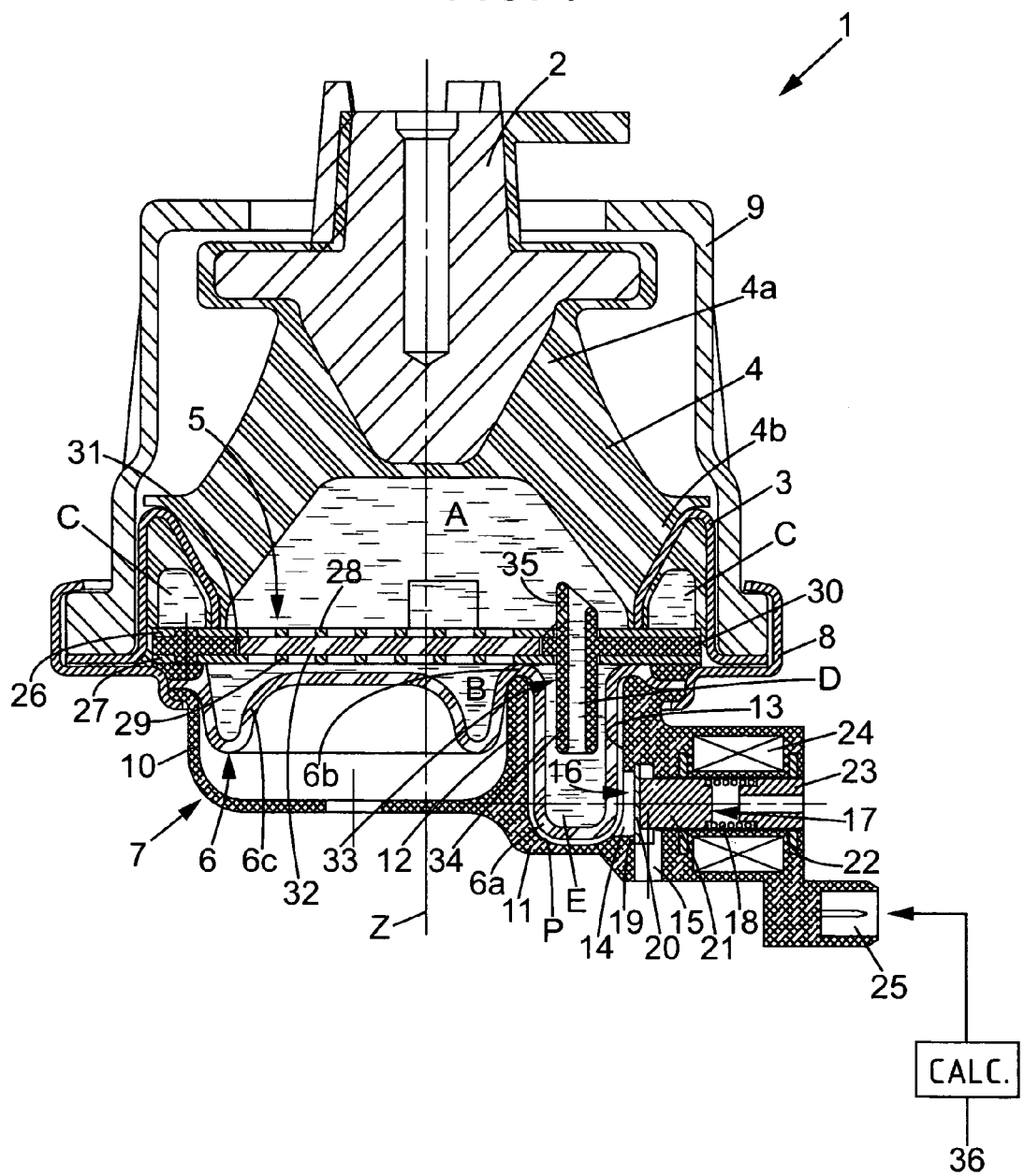
FIG. 1 is an axial section view of a first embodiment of a vibration-damping support of the invention.

FIG. 1 shows a controllable hydraulic vibration-damping support 1, comprising:
- a first rigid strength member 2, e.g. in the form of a metal base, serving, for example, to be fastened to the engine of a vehicle;
- a second rigid strength member 3, e.g. an annular strength member made of folded and cut-out sheet metal, that serves to be fastened, for example, to the body of the vehicle;
- an elastomer body 4 capable of withstanding, in particular, the static forces due to the weight of the engine of the vehicle, and interconnecting the first and second rigid strength members 2, 3, it being possible for said elastomer body to be bell-shaped, for example, the bell shape extending axially along an axis that is, for example, a vertical axis Z, between a top 4a bonded to and overmolded on the first strength member 2 and an annular base 4b overmolded on and bonded to the second strength member 3;
- a rigid partition 5 that is secured to the second strength member 3 and that is applied in leaktight manner against the base 4b of the elastomer body, so that it co-operates therewith to define a working hydraulic chamber A that is filled with liquid; and
- a flexible elastomer diaphragm 6 applied in leaktight manner against the partition 5 on the opposite side thereof from the working chamber A, so that it co-operates with said partition 5 to define a compensation hydraulic chamber B that communicates with the working chamber A via a constricted passageway C.

The vibration-damping support 1 further comprises an auxiliary hydraulic chamber E which communicates with the working chamber A via another constricted passageway D. Said auxiliary hydraulic chamber E is separated from a pneumatic chamber P by a moving wall that can be in any known form (in particular in the form of a piston, or of a flexible diaphragm, or in some other form) but which, in the example considered herein, is formed by a pouch 6a in the above-mentioned diaphragm 6.

In the example shown in FIG. 1, the hydraulic vibration-damping support further comprising a cover 7, e.g. made of a molded plastics material, that covers the diaphragm 6 on its underside. The cover can be fastened to the outside periphery of the diaphragm 6 by any known means, and said cover is pressed against the partition 5 on the opposite side thereof from the elastomer body 4, e.g. by means of a crimped metal ring 8 fastened to said second strength member. The ring 8 can also be crimped to a limiter cap 9 adapted to limit the extent to which the first strength member 2 can move relative to the second strength member 3.

The cover 7 can internally form two cups 10, 11 that are open towards the partition 5, and that press the diaphragm 6 into leaktight contact with said partition 5. In particular, the wall 12 of the cup 11 presses the diaphragm 6 against the partition 5 on a line 6b subdividing the diaphragm 6 into:

firstly, the above-mentioned pouch 6a of the diaphragm that defines the auxiliary chamber E; and secondly, a pouch 6c of the diaphragm that defines the compensation chamber B.

In addition to being internally defined by the pouch 6a of the diaphragm, the pneumatic chamber P is internally defined by an inside surface 13 of the wall 12 of the cup 11, and said pneumatic chamber communicates with the atmosphere via a bore 14 provided through said wall 12 of the cup 11. Said bore can, for example, communicate with a vent passageway 15 provided through the cover 7.

The bore 14 communicates with the vent passageway 15 via a check valve 16 which is adapted so that, under normal operating conditions (i.e. while not forced open), it allows air to flow out from the pneumatic chamber P towards the atmosphere and not to flow into the pneumatic chamber from the atmosphere. The check valve 16 can have a valve member 17 which is urged resiliently by a spring 18 so as to be applied against a valve seat 19. In the example considered herein, the valve seat 19 is formed in the wall of the cup 11, in the vicinity of the inside surface 13 of said cup, and said valve seat is formed by a shoulder that surrounds the bore 14 and that faces away from the pneumatic chamber P. The dead volume defined inside the bore 14 between the inside surface 13 and the valve seat 19 is thus minimized. Said dead volume advantageously lies in the range 0 cm$^3$ to 0.3 cm$^3$.

For example, the valve member 17 can be constituted:
firstly by a front end portion 20 made of a plastics material or the like, adapted to be pressed in leaktight manner against the valve seat 19; and secondly by a metal core 21, preferably made of a ferromagnetic material.

The core 21 is mounted to slide in a channel 22 provided in the cover 7, said channel 22 receiving the spring 18 and being closed in part towards the outside by a metal or other abutment 23 against which the spring 18 bears. Around the channel 22, a solenoid 24 can be embedded in the plastics material of the cover 7. The solenoid 24 can be powered electrically by external control means belonging to the vehicle, such as the on-board computer 36 (CALC.), via a connector 25. When an electrical current flows through the solenoid 24, said solenoid generates a magnetic field that moves the metal core 21 of the valve member 17 away from the valve seat 19, thereby putting the pneumatic chamber P into communication with the atmosphere.

In addition, in the example shown in FIG. 1, the rigid partition 5 is in the form of a composite plate comprising:

two perforated sheet metal plates 26, 27 provided with respective gratings 28, 29 one of which communicates with the working chamber A and the other of which communicates with the compensation chamber B;

an intermediate plate 30 interposed between the sheet metal plates 26, 27 and made, for example, of a plastics material, said intermediate plate having a recess 31 receiving a decoupling valve 32 formed by a flexible diaphragm made of elastomer, and said intermediate plate 30 further being provided with a tube 33 that can, for example, be formed integrally with the plate 31 and that defines the above-mentioned constricted passageway D.

The tube 33 has a main portion 34 that extends inside the auxiliary chamber E within the cup 11, and optionally a short segment 35 extending inside the working chamber A.

The above-described device operates as follows.

When the engine of the vehicle is idling, the computer 36 of the vehicle powers the solenoid 24 and thus forces the check valve 16 open, so that the pneumatic chamber P communicates with the atmosphere, thereby enabling the pouch 6a of the diaphragm 6 to move freely inside the cup 11: in this mode of operation, the vibration from the engine is transmitted to the working chamber A via the elastomer body 4, thereby causing fluctuations in the volume of said working chamber. These fluctuations are absorbed in part by the decoupling valve 32 and in part by the deformation in the auxiliary hydraulic chamber E. In view of the resonant frequency of the constricted passageway D (e.g. lying in the range 20 Hz to 80 Hz) which corresponds substantially to the frequency of the vibration emitted by the engine when it is idling, said constricted passageway D is then the subject of resonance phenomena that make it possible to filter out effectively the vibration from the engine.

Under certain predetermined conditions, e.g. while the vehicle is traveling (i.e. when the engine speed is greater than a certain predetermined limit), the computer 36 ceases to power the solenoid 24, so that the check valve 16 returns to the closed position under the action of the spring 18. In this mode of operation, the vibratory displacements of relatively large amplitude of the engine result in volume variations of relatively large amplitude in the working chamber A, thereby causing deformation in the compensation chamber B, so that the constricted passageway C, whose resonant frequency advantageously lies in the range 5 Hz to 20 Hz, is then the subject of resonance phenomena making it possible to achieve good vibration damping.

In addition, when the mode of operation is beginning to be established, the pneumatic chamber P still contains air, so that the pouch 6a in the diaphragm 6 can move, but such movements drive the air from the pneumatic chamber P through the check valve 16. When almost all of the air contained in the chamber P has been driven out, the pouch 6a of the diaphragm 6 remains substantially pressed against the inside wall 13 of the cup 11, as shown in FIG. 1, and the auxiliary hydraulic chamber E is deactivated, since said chamber then has a volume that is constant, so that no fluid passes along the constricted passageway D.

Figure 2:
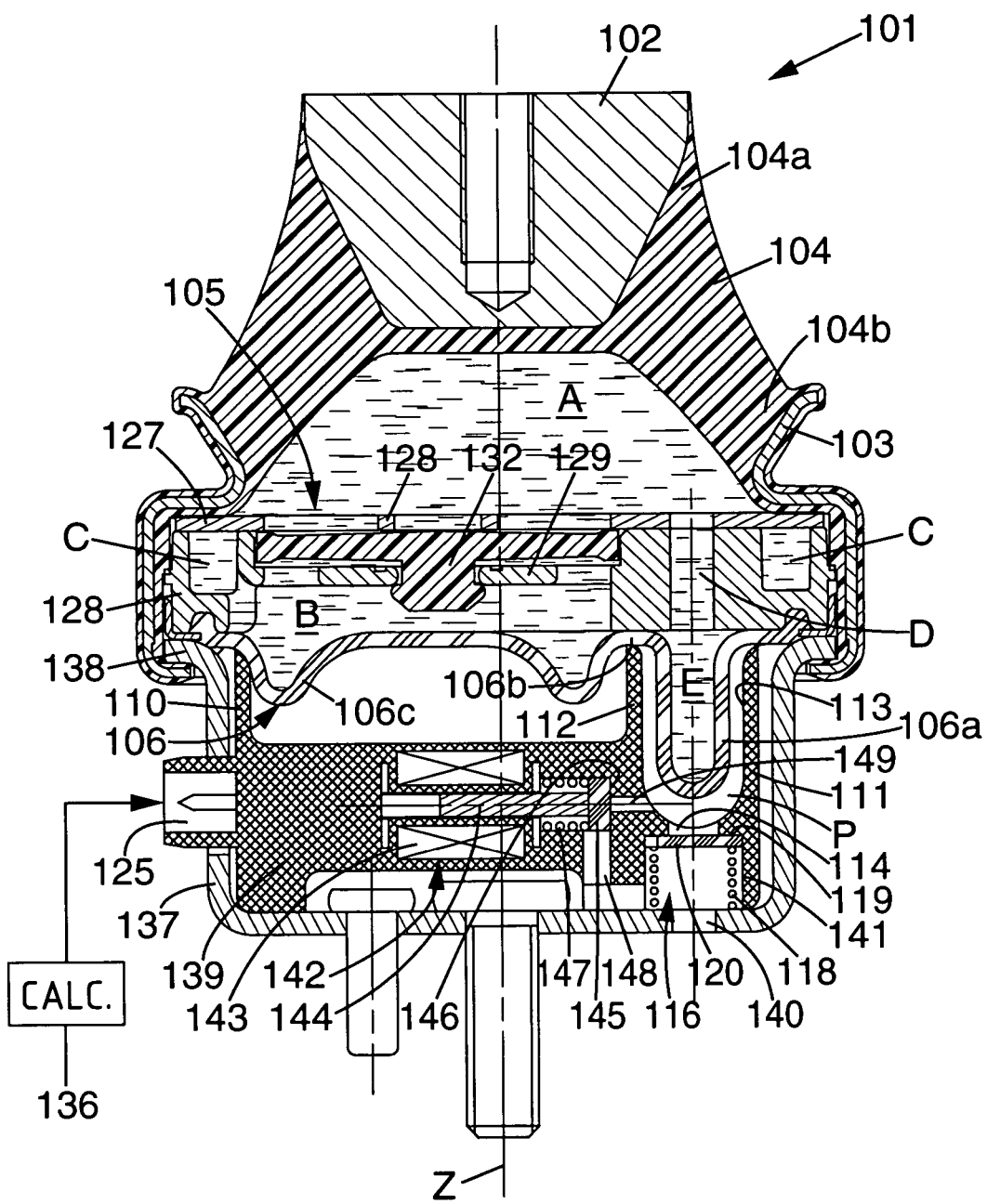
FIG. 2 is an axial section view of a second embodiment of a vibration-damping support of the invention.

In the second embodiment of the invention, shown in FIG. 2, the controllable hydraulic vibration-damping support 101 also comprises:

a first rigid strength member 102, e.g. in the form of a metal base, serving, in particular, to be fastened to the engine of a vehicle;

a second rigid strength member 103, e.g. an annular strength member made of folded and cut-out sheet metal, that serves to be fastened, in particular, to the body of the vehicle;

an elastomer body 104 capable of withstanding, in particular, the static forces due to the weight of the engine of the vehicle, and interconnecting the first and second rigid strength members 102, 103, it being possible for said elastomer body to be bell-shaped, extending axially along an axis that is, for example, a vertical axis Z, between a top 104a bonded to and overmolded on the first strength member 102 and an annular base 104b overmolded on and bonded to the second strength member 103;

a rigid partition 105 that is secured to the second strength member 103 and that is applied in leaktight manner against the base 4b of the elastomer body, so that it co-operates therewith to define a working hydraulic chamber A that is filled with liquid; and a flexible elastomer diaphragm 106 applied in leaktight manner against the partition 105 on the opposite side thereof from the working chamber A, so that it co-operates with said partition 105 to define a compensation hydraulic chamber B that communicates with the working chamber A via a constricted passageway C that can, for example, have a resonant frequency lying in the range 5 Hz to 20 Hz.

The partition 105 can optionally include a sheet metal plate 127 covering a shell 128 that can, for example, be made of a lightweight alloy. The constricted passageways C, D are defined inside the shell. The plate 127 and the shell 128 can be provided with respective gratings 129, 130 facing the working chamber and the compensation chamber, and a decoupling valve 132 formed by an elastomer diaphragm can be disposed between said gratings.

The vibration-damping support 101 further comprises an auxiliary hydraulic chamber E which communicates with the working chamber A via another constricted passageway D provided in the partition 105, it being possible for said constricted passageway D to have a resonant frequency lying in the range 20 Hz to 80 Hz, for example. The auxiliary chamber E is separated from a pneumatic chamber P by a moving wall that can be in any known form (in particular in the form of a piston, or of a flexible diaphragm, or in some other form) but which, in the example considered herein, is formed by a pouch 106a in the above-mentioned diaphragm 106.

In the example shown in FIG. 2, the hydraulic vibration-damping support 101 further comprises a metal cover 137 that covers the diaphragm 106 on its underside, and that is pressed against the rigid partition 105 on the opposite side thereof from the working chamber A by crimping a portion of the second strength member 103. The periphery of the diaphragm 106 can be clamped axially between the partition 105 and a peripheral edge 138 of the cover 137.

In addition, a support block 139, e.g. made of a molded plastics material, can be disposed inside the cover 137. The support block 139 forms two cups 110, 111 that are open towards the partition 105 and that locally press the diaphragm 106 into leaktight contact with said partition 105 so as to define the pouch 106a and a pouch 106c of said diaphragm 106 in correspondence with the compensation chamber B. Said pouches 106a, 106c are separated from each other by a contact line 106b along which said diaphragm 106 is pressed into leaktight contact with the partition 105 by the wall 112 of the cup 111. The wall 112 of the cup 111 has an inside surface 113 that defines the above-mentioned chamber P with said pouch 106a.

In addition, the wall of the cup 111 is provided with a bore 114 that communicates with the atmosphere via an orifice 140 in the cover 137, via a check valve 116 that is adapted to allow air to flow only out from the pneumatic chamber P to the atmosphere and not to flow into the pneumatic chamber from the atmosphere.

In the example shown in FIG. 2, the bore 114 opens out in a chamber 141 of larger diameter that defines a shoulder forming a valve seat 119 around said bore 114. A valve member 120 is disposed in the chamber 141 and is urged resiliently against the valve seat 119 by a spring 118.

In addition, the support block 139 also includes a solenoid valve 142 that can, for example, comprise:

a solenoid 143 connected to a connector 125 itself connected to an electronic control device such as the on-board computer 136 (CALC.) of the vehicle;

a metal core 144 made of a ferromagnetic material and mounted to slide in an empty channel at the center of the solenoid 143; and a closure member 145 secured to the core 144 and resiliently urged against a valve seat 146 by a spring 147.

The closure member 147 is adapted to close a vent passageway 148 that causes a side bore 149 opening out into the pneumatic chamber P to communicate with the above-mentioned chamber 141. The dead volume defined inside the side bore 149 between the valve seat 119 and the inside surface 113 of the cup 111 advantageously lies in the range 0 $cm^3$ to 0.3 $cm^3$.

In the second embodiment of the invention, the vibration-damping support 101 operates substantially in the same way as the vibration-damping support 1 of FIG. 1, except that the pneumatic chamber P is connected to the surrounding air independently of the check valve 116, by means of the solenoid valve 142. However it should be noted that, in this embodiment, the spring 147 of the solenoid valve 142 can optionally be calibrated so that the solenoid valve 142 itself operates as a check valve when the solenoid 143 is not powered, as described above with reference to FIG. 1.

What is claimed is:

1. A controllable hydraulic vibration-damping support designed to be interposed for vibration-damping purposes between first and second rigid elements, said vibration-damping support comprising: first and second strength members serving to be fastened to two rigid elements to be connected together; an elastomer body which connects the two strength members together and which defines, at least in part, a working chamber filled with liquid; an auxiliary chamber itself filled with liquid, communicating with the working chamber via a first constricted passageway; a pneumatic chamber separated from the auxiliary chamber by a moving wall formed in a cup having a wall; and an electrically controlled vent device for establishing a connection to the air, which device can be actuated electrically in order to put the pneumatic chamber into communication with the atmosphere via a check valve having a valve seat normally allowing air to flow only out from the pneumatic chamber towards the atmosphere and not to flow into the pneumatic chamber from the atmosphere; wherein, between the valve seat and the inside surface of the pneumatic chamber, there is defined a dead volume of less than 0.3 $cm^3$ and characterized in that the valve seat is formed in the wall of said cup.

2. A vibration-damping support according to claim 1, in which the check valve comprises a valve member resiliently urged against the valve seat, and the vent device comprises an electrical actuator suitable for moving the valve member away from the valve seat.

3. A vibration-damping support according to claim 2, in which the electrical actuator is adapted to generate a magnetic field by induction, and the valve member includes a metal portion adapted to be moved under the effect of said magnetic field.

4. A vibration-damping support according to claim 3, in which the electrical actuator comprises a solenoid surrounding a central passageway, and the valve member includes a metal core mounted to slide in said central passageway.

5. A vibration-damping support according to claim 2, in which the vent device comprises a solenoid valve adapted for selectively opening or closing a passageway to the surrounding air independently of the valve member.

6. A vibration-damping support according to claim 1, in which the pneumatic chamber is defined firstly by said moving wall and secondly by a rigid outside wall which has an inside surface, the check valve comprising a valve member that is resiliently urged against the valve seat, and the valve seat being formed in said outside wall of the pneumatic chamber, in the vicinity of the inside surface of said outside wall.

7. A vibration-damping support according to claim 1, in which the moving wall is an elastomer diaphragm.

8. A vibration-damping support according to claim 1, in which the vibration-damping support further comprises a compensation chamber filled with liquid, which chamber communicates with the working chamber via a second constricted passageway.

9. A vibration-damping support according to claim 8, in which the compensation chamber is separated from the working chamber by a rigid partition provided with a decoupling valve which has two faces communicating respectively with the working chamber and with the compensation chamber, said decoupling valve being adapted to vibrate with limited amplitude between said working chamber and said compensation chamber.

10. A vibration-damping support according to claim 1, in which the first constricted passageway has a resonant frequency lying in the range 20 Hz to 80 Hz.

* * * * *